UNITED STATES PATENT OFFICE.

NELSON S. WHITE, OF CANTON, MASSACHUSETTS.

ADHESIVE COMPOUND.

SPECIFICATION forming part of Letters Patent No. 241,576, dated May 17, 1881.

Application filed January 28, 1880.

*To all whom it may concern:*

Be it known that I, NELSON S. WHITE, of Canton, in the county of Norfolk and State of Massachusetts, have invented a new and useful Adhesive Compound, of which the following is a specification.

My present invention relates to adhesive compounds for securing together two or more pieces of wood, glass, china, cloth, paper, leather, or other substances; and it consists in the combination of silicate of soda, carbonate of lime, carbolate of magnesia, albumen, and chloride of sodium or common salt, thoroughly mixed and united to form an adhesive compound, as will be described.

To enable others skilled in the art to make and use my invention, I will now proceed to describe the method of manufacturing the same, and the proportions of the several ingredients used, which are as follows:

I first place in an ordinary tub or other suitable open vessel twelve gallons of silicate of soda as the base of the adhesive material to be produced. I then take two and one-half pounds of carbonate of lime, place it in a separate vessel, and cover it with water, and continue to add water till it is thoroughly saturated, or will absorb no more, and then pour it upon the top of the silicate of soda in the tub, and allow it to gradually filter through the same to the bottom of the tub till it has all united with the silicate or settled to the bottom, when the mass is agitated and allowed to stand till the carbonate of lime has again filtered through the silicate to the bottom of the tub, or so much of it as will not unite with and be held in suspension by the silicate. I then take about four (4) ounces of pulverized carbolate of magnesia and treat it with water in the same manner as the carbonate of lime was treated, and pour it into the tub with the silicate of soda and carbonate of lime, agitating the whole mass for ten or fifteen minutes to thoroughly mix the several ingredients. After the mass has become quiet and the sediment has settled to the bottom, I add six (6) ounces of chloride of sodium or common salt dissolved, and four (4) or five (5) ounces of albumen in a dry state, agitate the mass for ten or fifteen minutes, and allow it to stand about four hours, when it is again slightly agitated to ascertain whether the substances have all dissolved that will, and then it is allowed to stand for three or four hours to permit the sediment to settle, when it is drawn off into a barrel, leaving the sediment in the tub, and is allowed to stand exposed to the air about ten days or two weeks to permit the carbonic-acid gas in the atmosphere to act chemically upon the mass to neutralize, to a great extent, the alkaline properties of the compound. If, however, it is desired to hasten this neutralization, it may be done by the addition of a diluted acid in suitable quantity, and thoroughly incorporating it with the compound by agitation or other mechanical means.

This compound is equally adapted to coating the interior of wooden or paper boxes, barrels, or other vessels, to render them oil, acid, or brine proof.

The proportions of the several ingredients are subject to slight variations, on account of differences in the qualities of the several chemicals, and may be slightly varied when the same quality of chemicals is used without materially injuring the quality of the compound.

What I claim as new, and desire to secure by Letters Patent of the United States, is—

An adhesive compound or cement composed of silicate of soda, carbonate of lime, carbolate of magnesia, chloride of sodium, and albumen, substantially as described.

Executed at Boston, Massachusetts, this 16th day of January, A. D. 1880.

NELSON S. WHITE.

Witnesses:
E. A. HEMMENWAY,
WALTER E. LOMBARD.